United States Patent [19]

Weitz, Jr. et al.

[11] 4,412,270
[45] Oct. 25, 1983

[54] ELECTRODE ASSEMBLY FOR A CAPACITANCE TYPE PROBE

[75] Inventors: Paul G. Weitz, Jr., Salisbury; Cecil Franklin, Middlebury, both of Vt.

[73] Assignee: Simmonds Precision Products, Inc., Tarrytown, N.Y.

[21] Appl. No.: 277,427

[22] Filed: Jun. 25, 1981

[51] Int. Cl.³ ............................................. G01F 23/26
[52] U.S. Cl. ................... 361/284; 73/304 C; 324/61 P
[58] Field of Search .............. 361/284; 73/304 C; 324/61 P

[56] References Cited

U.S. PATENT DOCUMENTS

| | | | |
|---|---|---|---|
| 3,109,882 | 11/1963 | Maltby | 324/61 P |
| 3,200,312 | 8/1965 | Callahan | 361/280 |
| 3,475,960 | 11/1969 | Miller | 73/304 C |
| 3,870,951 | 3/1975 | Brown et al. | 324/61 P |

Primary Examiner—M. H. Paschall
Assistant Examiner—Alfred S. Keve
Attorney, Agent, or Firm—Edwin E. Greigg

[57] ABSTRACT

An electrode assembly for use in a capacitance type probe for measuring volume or height of an electrically conductive liquid. The probe includes an inner conductor which an electrical conductive wire is connected at one end. The inner conductor is surrounded by a thick-wall TEFLON tube which functions as an insulator. A thin-wall TEFLON sleeve is heat shrunk onto the thick-wall TEFLON tube and the ends of the thin-wall sleeve are heated and sealed about the thick-wall tube to prevent any leakage of fluid to the inner conductor. The assembly is also provided with a polyurethane foam to provide rigidity and to prevent moisture from forming within the assembly.

5 Claims, 3 Drawing Figures

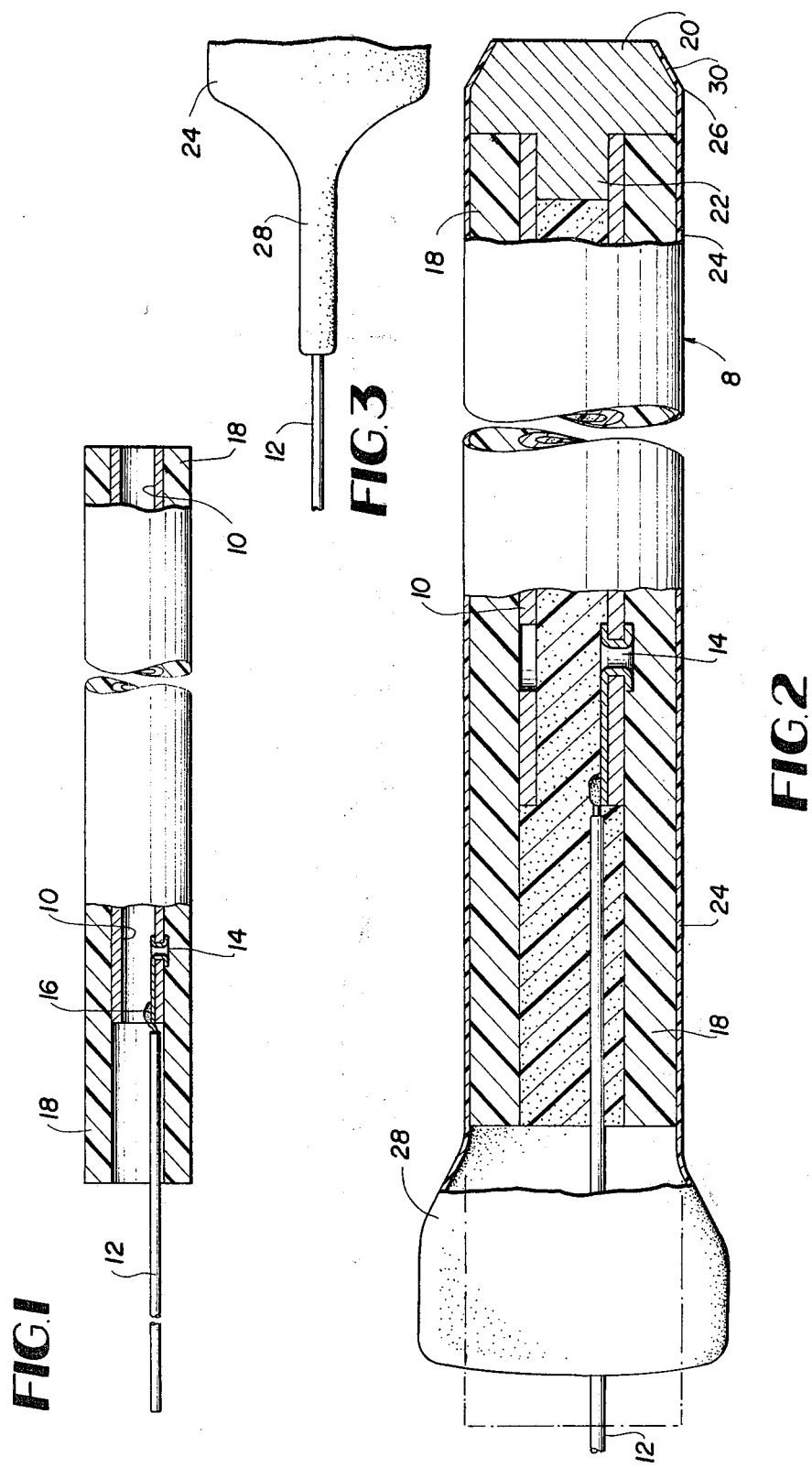

ELECTRODE ASSEMBLY FOR A CAPACITANCE TYPE PROBE

BACKGROUND OF THE INVENTION

The present invention is directed to an electrode assembly useful in capacitance type probes for measuring the volume or height of conductive liquids.

Heretofore electrode assemblies have been made which because of their construction were subject to leakage of the measured fluid into the electrode assembly. Such leakage would make the device inaccurate or inactivate the measuring device entirely.

A prior art capacitance probe such as U.S. Pat. No. 3,200,312 has been made in which the electrical conductor is made of a rod which is enclosed by a TEFLON (a synthetic resin polymer) sleeve with end caps or plugs that fit into the Teflon sleeve. Retaining rings hold the plugs in place to prevent leakage at the ends of the TEFLON (a synthetic resin polymer) sleeve. In this device the electrical connection with the rod is sealed by O-rings. These O-rings could deteriorate which could allow leakage to the electrical connection.

SUMMARY OF THE INVENTION

An electrode assembly useful in a capacitance type probe for measuring volume or height of an electrically conductive liquid. The electrode assembly includes an inner conductive element which is surrounded by a TEFLON medium that seals the inner conductive element from the surrounding medium. The TEFLON medium also serves as the insulating medium and the inner conductive element which produces a capacitance effect in combination with the surrounding medium.

An object of the invention is to provide a highly reliable electrode assembly which is free of leaks from the surrounding medium.

Another object is to provide a method for sealing the electrode assembly such that it will be free of leaks.

BRIEF DESCRIPTION OF THE DRAWING

FIG. 1 is a partial cut-away cross-sectional view illustrating Teflon coated electrical wire connection with an inner tubular electrically conductive element with a surrounding thick-wall TEFLON tube.

FIG. 2 is a partial cut-away view of an electrode assembly prior to sealing the upper end of an outer TEFLON sleeve.

FIG. 3 is a partial side view illustrating the upper end of the outer TEFLON sleeve sealed about a TEFLON coated conductive wire.

DETAILED DESCRIPTION

The electrode assembly of this invention is formed by an elongated inner tubular element 10 made of aluminum or any other suitable conductive material having a thickness of about 1/32 inch with and outside diameter of about ¼ inch. A TEFLON FEP (fluorinated ethylpropylene) coated, insulated electrical wire or conductor 12 is stripped of its TEFLON FEP coating along one end and secured near one end of the tubular element by a terminal connector 14 and at the adjacent end of the tubular element by use of solder 6. A thick-wall TEFLON TFE (polytetrafluoroethylene TEFLON) tubing, having a length greater than the tubular element and an outside diameter of about 0.5050 inch is pressed over the tubular element to surround the tubular element with the end opposite from the wire connected end on the same plan. A plug or cap 20 of FEP TEFLON having the same outer diameter as the thick-wall tubing 18 is provided with a protruding portion 22 that is press-fitted into the end of the tubular element to which the wire is not connected. A thin-wall TEFLON FEP sleeve 24 having a thickness of about 1/64 inch and a length of about ¾ inch longer than the thick-wall tubing 18 is press fitted onto the thick-wall tubing with its lower end even with the bottom of the plug 20. The tubing 24 is then heat-shrunk onto the thick-wall tubing. The assembly is sealed by fusing the bottom end 26 of the FEP tubing to the plug 20 and the upper end 28 to itself and the TEFLON FEP coating of the wire. The length of the electrode assembly may be made of any desired length.

The electrode assembly is assembled by the following method.

The wire 12 is connected to the end of the aluminum tubular element 10 and the combined elements are placed into a cold chamber at −50° F. for about one hour. Simultaneously, the thick-wall TFE tube 18 is placed in an oven heated to a steady temperature of about 425° F. for one hour. After the one hour, the aluminum tubular element and TEFLON TFE tube are removed from their respective mediums using protective gloves. The aluminum tubular element is positioned vertically on a hard surface with the wire connected end up. The hot thick-wall tube is quickly slid over the cold aluminum tubular element with its end bottomed on the hard surface even with the end of the bottom of the tubular element. The assembled tubes are allowed to cool to room temperature. The outer tube may need adjusting during cooling to keep the ends of the tubes in the same plane on the hard surface. Subsequent to cooling, the plug 20 is fitted and sealed in the end of the tubular element 18 by heating the plug. The tubular assembly is filled with polyurethane foam from the top of the plug 20 in the bottom to the upper end of the thick-wall tube 18. The polyurethane foam provides rigidity for the thin aluminum tubular element, removes all the air from within the aluminum tubular element and prevents moisture from accumulating within the aluminum tubular element. It is to be noted that the plug 20 has a decreasing diameter section 30 toward its bottom end.

The outer surface of the thick-wall TFE tube is ground to a smooth outside diameter of about 0.5050 inch ± 0.0005 inch and wiped clean with a lint-free cloth and alcohol. The outer FEP sleeve is slid over the thick-wall TFE tube from the wire connected end until the bottom end 26 of the FEP sleeve is even with the bottom of the plug 20. The top portion of the FEP sleeve should extend from ½ to ¾ inch above the upper end of the thick-wall tube. The FEP sleeve is then shrunk onto the thick-wall tube by application of heat beginning at the plug end. Any well known heat means may be used. The assembly is slowly rotated and heat continually applied as the heat means is slowly moved toward the wire end of the assembly until the assembly is uniformity heated over its entire length. If necessary, the end of the heat shrunk sleeve should be trimmed to maintain a length of from ½ inch to ¾ inch extending above the end of the thick-wall tube.

Subsequent to shrinking the FEP sleeve onto the TFE tube, the ends of the FEP sleeve are sealed by melt sealing the ends 24 and 26. The plug end is placed in a squeeze machine and the plug and bottom end of the FEP sleeve are heated with high heat until the FEP sleeve and plug starts to soften, the end 24 of the FEP sleeve is then squeezed against the surface of the FEP plug to make a smooth uniform seal between the FEP plug and the bottom end of the FEP sleeve.

The upper end of the assembly is placed with the end of the FEP sleeve in a squeeze machine. With the heat gun on high, the heat is directed uniformly onto the upper surface of the FEP sleeve until the material softens, the heat is quickly removed and the softened upper end of the FEP sleeve is pressed together around the Teflon FEP coated wire to form a seal between the Teflon FEP coating on the wire and the FEP sleeve end 26 pressed around the wire 12. The edges of the FEP sleeve should be uniformly sealed together with the wire insulation melted into the FEP sleeve squeezed around the wire. Care must be taken to avoid over heating the FEP sleeve and blowing small pin holes in the material.

In use of the electrode assembly in a capacitance type probe for measuring volume or height of a conductive liquid, the electrode assembly 8 is immersed vertically in a container which contains the conductive liquid. The container is grounded or is provided on its inside with an electrically conductive coating which is grounded. The wire 12 is connected to the opposite pole of an electrical circuit. The conductive liquid becomes the electrical conductor and forms are of the active element with the inner conductive tubular element 10 forming the other active element. The capacitance between the conductive liquid and the inner conductive tubular element 10 feeds into an electric network as an input signal. The input signal is then calibrated to indicate either volume or height as desired.

I claim:

1. An electrode assembly for use in a capacitance type probe for measuring the volume or height of electrically conductive liquids which comprises:

an inner conductive element, having an upper end and a bottom end;
   a TEFLON coated electrical conductor secured in electrical contact with the upper end of said inner conductive element for conducting current from one to the other;
   a thick-wall TEFLON tube pressed over the upper end of said inner conductive element with its bottom end even with said bottom end of said inner conductive element and the upper end extending above the upper end of said inner conductive element;
   an end plug secured to the bottom end of said inner conductive element and said thick-wall TEFLON tube;
   an outer TEFLON FEP sleeve coaxial with said inner conductive element and said thick-wall TEFLON tube, said outer TEFLON FEP sleeve extending around said end plug and above the upper end of said thick-wall TEFLON tube, said outer TEFLON FEP sleeve sealed to said end plug along its side and to said TEFLON coated electrical conductor at its upper end.

2. An electrode assembly as claimed in claim 1 wherein said inner conductive element is tubular; and said end plug includes a portion that protrudes into said bottom end of said inner conductive element.

3. An electrode assembly as claimed in claim 2 wherein:
   said tubular inner conductive element and a portion of said thick-wall TEFLON tube are filled with a polyurethane foam.

4. An electrode assembly as claimed in claim 2 wherein:
   said thick-wall tube is a TEFLON TFE tube, and said outer TEFLON sleeve is a Teflon FEP sleeve.

5. An electrode assembly as claimed in claim 3 wherein: said thick-wall tube is a TEFLON TFE tube, and said outer TEFLON sleeve is a TEFLON FEP sleeve.

* * * * *